(No Model.)

W. W. OWENS.
NUT LOCK.

No. 527,154.  Patented Oct. 9, 1894.

WITNESSES
H. Dixon
Albert A. Beares

INVENTOR
W. W. Owens
per W. J. Graham
Atty.

UNITED STATES PATENT OFFICE.

WILLIAM W. OWENS, OF PETERBOROUGH, CANADA.

NUT-LOCK.

SPECIFICATION forming part of Letters Patent No. 527,154, dated October 9, 1894.

Application filed April 10, 1894. Serial No. 507,073. (No model.)

*To all whom it may concern:*

Be it known that I, WILLIAM WESLEY OWENS, of the town of Peterborough, in the county of Peterborough and Province of Ontario, Canada, have invented certain new and useful Improvements in Nut-Locks for Railway-Fish-Plate Bolts, of which the following is a specification.

My invention relates to an improved and comparatively simple nut-lock adapted to secure the nut or nuts on fish plate bolts from unscrewing and coming off, and the object of the invention is to provide a nutlock, besides being cheap, simple and effective, that is easily placed, and can be opened several times subsequently to change and repair the fish plates or rails.

Figure 1:
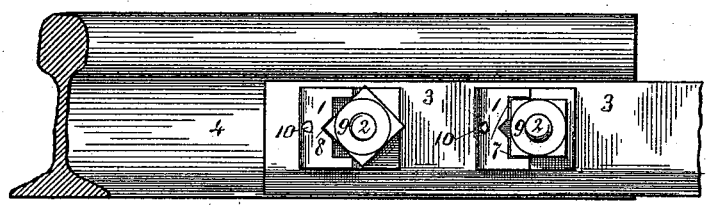
Figure 2:
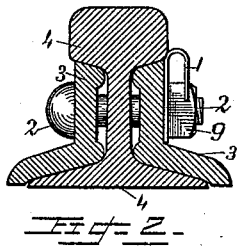
Figure 3:
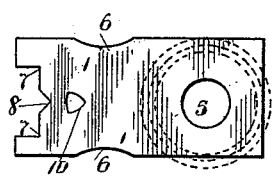

In the accompanying drawings illustrating my invention and in which similar numbers of reference refer to similar parts throughout, Figure 1 represents an end portion of a railway rail and a portion of a fish plate thereon, provided with my improved nutlocks securing the nuts from turning. Fig. 2. represents a transverse section of the rail and the fish plates in end elevation and shows the nutlock in the turned-down position. Fig. 3. represents the nutlock at the first operation of the manufacturer; and Fig. 4. represents the finished nutlock in position beneath a nut and ready to be turned down to lock the nut from unscrewing.

My improved nutlock 1, is constructed, or more particularly punched, from sheet steel of about fourteen or sixteen gage. The soft, mild or tough steel is employed so that it can be bent and straightened several times before breaking, which allows the removal of the bolts 2, to renew the fish plates 3, or the rails 4, for repairs, reconstruction, &c.

The nutlock 1, is first punched out in the form shown by Fig. 3 showing a rectangular plate about twice as long as its width and having a bolt hole 5, near one end to admit the fish plate bolt 2 through it. The bolt hole 5 is punched in a particular relative position to the end and side limits of the plate composing the nutlock 1, to provide for different widths of rails and the plain and flanged fish plates 3, used; and as arranged, it provides for three widths from the hole to the end and upper and lower limits of the nutlock 1, so that if the end turned downward as in Fig. 2 is found not to fit between the bolt 2, and the flange of the rail 4, or, of the fish plate 3, (where the latter is flanged) the side can be turned and the nutlock 1, stand longitudinally as in Fig. 1. The next, or final operation of construction of my nutlock 1, is to bend it into the shape shown by Fig. 4. To enable this bend being made and preserved near the same line across the plate, curved cut outs as at 6, are formed when stamped out originally and opposite one another transverse of the plate.

In the opposite end of the plate from that in which the bolt hole 5, is located, is a rectangular cut out 7, having at the center of its longer side a triangular extension 8, so as to adapt the nutlock 1, to fit either a square or hexagonal nut, the extension 8, engaging one of the angles of the nut 9.

Figure 4:
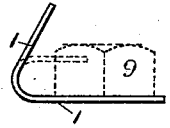

To provide a means for bending the nutlock 1 fully to engage a nut, I employ a hole 10, at a point in line between the outer ends of the curved cut outs 6, and by inserting a suitable shaped tool into this hole 10 the plate forming the nutlock 1 can be easily turned down fully to engage the nut on the bolt 2 as shown dotted in this position in Fig. 4.

My improved nutlock 1 is also applicable to various structures of wood where bolts are employed to secure the parts together. The nut is screwed sufficiently tight to press the plate beneath it into the wood to prevent it turning with the nut. Then the free end is turned down to engage the nut as in securing the nut on the fish plates.

Having described my invention, what I claim, and desire to secure by Letters Patent, is—

As a nut lock, the plate having therein the combination, of a bolt hole near one end and at unequal distances from the end and side limits as specified, the curved cut outs opposite one another in the side limits, a rectangular cut out in the end opposite that having the bolt hole therein, and a hole in the plate between said curved and rectangular cut outs as a means by which to bend a portion of the plate toward the said bolt hole, substantially as shown and described.

W. W. OWENS.

Witnesses:
GEO. SAVAGE,
E. THOMAS.